(12) United States Patent
Milburn

(10) Patent No.: US 6,699,558 B1
(45) Date of Patent: Mar. 2, 2004

(54) LIGHT-DIFFUSING, INSULATING, GLAZING SYSTEM COMPONENT

(75) Inventor: Douglas I. Milburn, Nova Scotia (CA)

(73) Assignee: Advanced Glazings Ltd., Sydney (CA)

( * ) Notice: Subject to any disclaimer, the term of this patent is extended or adjusted under 35 U.S.C. 154(b) by 0 days.

(21) Appl. No.: 10/088,635

(22) PCT Filed: Sep. 22, 2000

(86) PCT No.: PCT/CA00/01110
§ 371 (c)(1),
(2), (4) Date: Jul. 17, 2002

(87) PCT Pub. No.: WO01/21906
PCT Pub. Date: Mar. 29, 2001

(30) Foreign Application Priority Data

Sep. 22, 1999 (CA) .............................................. 2282998

(51) Int. Cl.⁷ .................................................. B32B 3/00
(52) U.S. Cl. ...................... 428/73; 428/116; 428/34.1; 156/109; 156/290; 52/783.1; 52/786.1; 52/786.13; 52/793.1; 52/793.11; 52/794.1
(58) Field of Search ...................... 428/73, 34, 116–118, 428/138, 178, 34.1, 913; 156/60, 109, 290; 52/783.1, 786.1, 786.13, 793.1, 793.11, 794.1; 359/591, 596

(56) References Cited

U.S. PATENT DOCUMENTS 5,230,291 A * 7/1993 Juvik-Woods
5,830,548 A * 11/1998 Andersen et al.

FOREIGN PATENT DOCUMENTS

| DE | 1 957 208 | | 5/1971 |
| DE | 30 16 241 | A1 | 10/1981 |
| DE | 34 33 202 | A | 3/1986 |
| DE | 37 08 847 | A1 | 11/1987 |
| DE | 92 05 226.6 | | 8/1993 |
| FR | 1246493 | | 2/1961 |
| FR | 2 739 803 | | 4/1997 |
| GB | 2 116 590 | A | 9/1983 |

* cited by examiner

Primary Examiner—Deborah Jones
Assistant Examiner—Wendy Boss
(74) Attorney, Agent, or Firm—Marks & Clerk

(57) ABSTRACT

A light diffusing insulating glazing insert consists of a flexible thin-walled honeycomb transparent insulation, to which is bonded a diffusing sheet, on one or both sides This provides a practical solution to problems related to utilizing thin-walled flexible honeycombs in glazing units consisting of two sheets of glass, plastic, or similar and a spacer/frame, as standard for window and skylight applications. Use of such a glazing insert adds insulation and light diffusion to the glazing system.

13 Claims, 2 Drawing Sheets

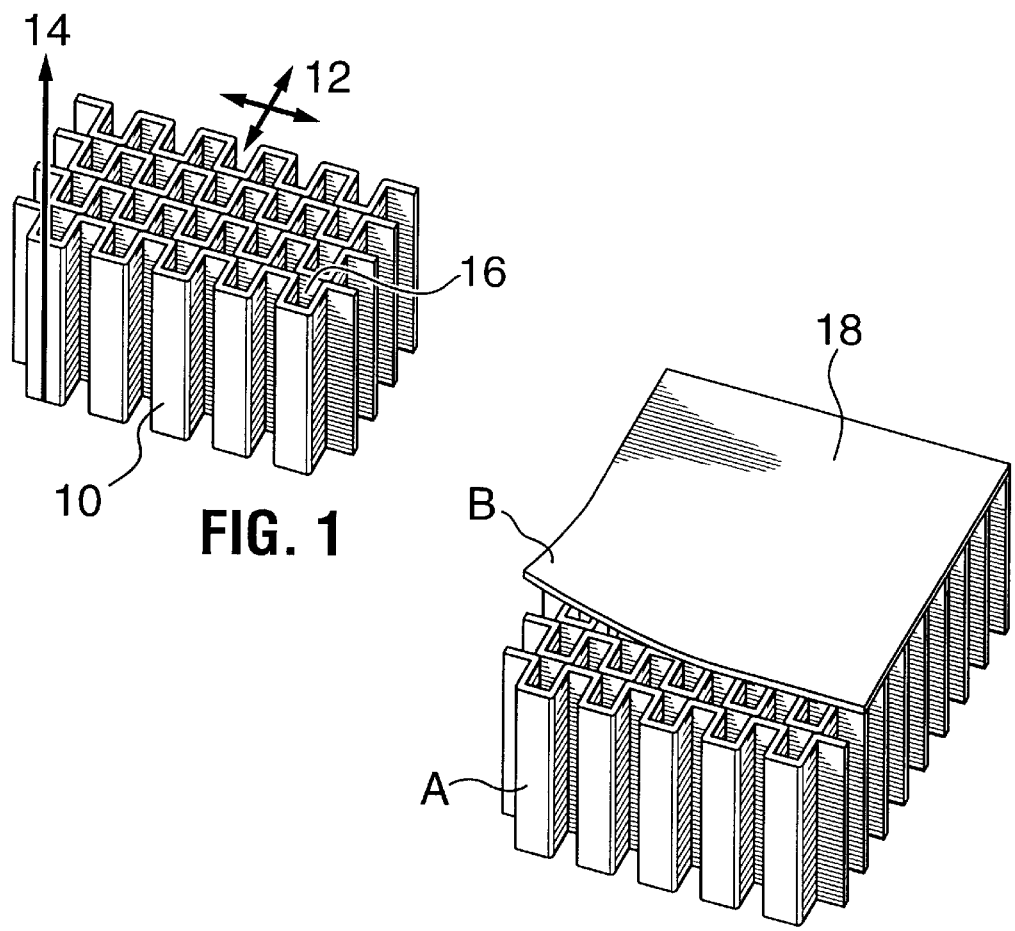
FIG. 1
FIG. 2A
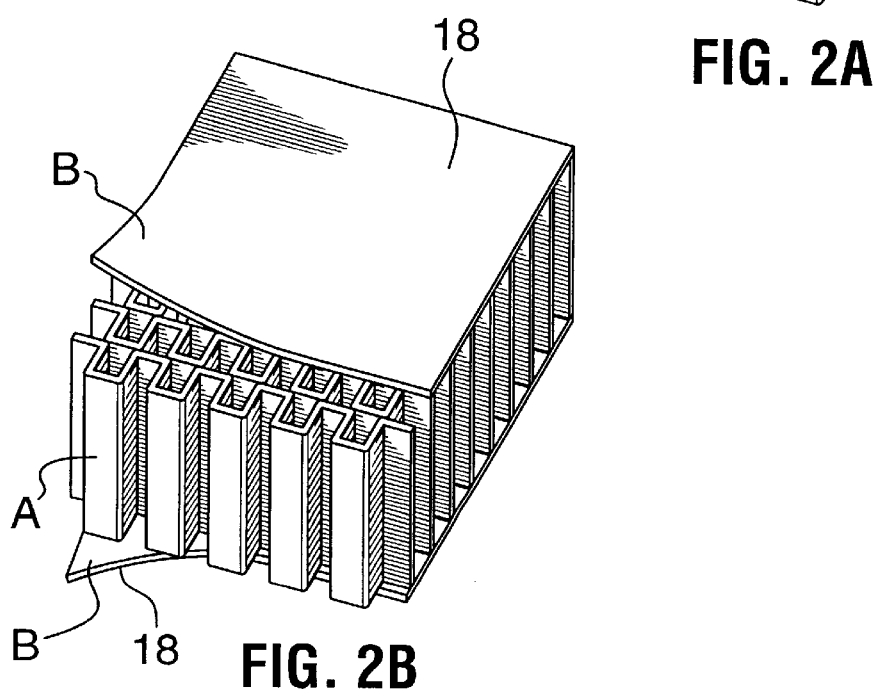
FIG. 2B

LIGHT-DIFFUSING, INSULATING, GLAZING SYSTEM COMPONENT

FIELD OF THE INVENTION

This invention relates to glazing systems such as windows, skylights, atriums, greenhouses, sunrooms and the like.

BACKGROUND OF THE INVENTION

Honeycomb transparent insulation was first developed in the early 1960's in order to enhance the insulation value of glazed systems, with minimum loss of light transmittance. Honeycomb transparent insulation consists of transparent-walled honeycombs, with open-ended cells whose axes are oriented parallel to the normal vector of the plane of the glazing. The materials transmit light by a forward-reflection process, and impede heat transfer by suppressing convection and radiant transfer. These mechanisms are well understood and described in the technical literature. See, for example, "Coupled Radiative and conductive heat transfer across honeycomb panels and through single cells", K. G. T. Hollands et al., Int. J. Heat Mass Transfer v.27, n.11 pp. 2119–2131, 1984; "An approximate equation for predicting the solar transmittance of transparent honeycombs", K. G. T. Hollands, K. N. Marshall, and R. K. Wedel, Solar Energy, v.21 pp. 231–236, 1978).

Honeycomb transparent insulation is typically made from transparent plastics such as acrylic, polycarbonate, or polypropylene. These are manufactured by a number of different techniques, including capillary bundling, extrusion, and film-fabrication. Their properties (such as light transmittance, insulation value, rigidity, weight, etc.) strongly depend on how they were manufactured. Examples of honeycomb transparent insulations are InsolCore®, a film-based transparent insulation made by Advanced Glazings Ltd., Nova Scotia, Canada, Kapillux®, a capillary-bundled transparent insulation made by Okalux Kapillarglas Gmbh. of Marktheidenfeld-Altfeld, Germany, and AREL®, an extruded transparent insulation made by Arel Energy Ltd., Yavne, Israel.

It is often desirable to use honeycomb transparent insulation in a glazing unit, where it is mounted between two panes of glass, sheets of plastic, or similar, taking the place of the air gap or gas layer that traditionally provides insulation. Such glazing units can be used to let daylight into buildings, while at the same time, providing good insulation. They can be used in skylights, sunrooms, atriums, or certain window applications, or anywhere natural light is desired but a clear view of the outdoors is not necessary or desirable. The use of such honeycomb transparent insulation-filled glazing units gives the advantage of lower heat transfer (which in cold climate, causes warmer interior surface temperature, in increased thermal comfort and less condensation, and in warm climates, means lower air conditioning costs), diffuse light transmittance (resulting in high-quality uniform natural light and lower glare), and privacy.).

Rigid thick-walled honeycombs are straightforward to use in glazing units, where they are simply sandwiched in between the two sheets of glass. The rigidity of such transparent insulations prevents them from 'sagging' under their own weight, when used in inclined or vertical positions. Thus it is not necessary to fix the transparent insulation to the frame of the glazing unit or to on or both of the glazings. An example of the use of a glazing unit incorporating a rigid honeycomb transparent insulation is Okalux, made by Okalux Kappilarglas Gmbh. of Marktheidenfeld-Alffeld, Germany. This product consists of rigid capillary-bundled honeycomb transparent insulation, covered on both sides by a light diffusing fiberglass veil cloth, and sandwiched inside two pieces of clear glass, and surrounded by a spacer/frame to create a glazing unit. It is important to note that the fiberglass cloth is not bonded to the honeycomb, and is included for the purpose of diffusing light as well as for aesthetic value.

One very important parameter in determining properties of honeycomb transparent insulations is wall thickness. It is often desirable to construct honeycomb transparent insulations with the minimum practical wall thickness, because (with all other variables held constant) this results in minimum solid heat conduction, minimum optical losses, and material cost. However, the rigidity of the honeycomb is reduced as the walls become thinner. The range of practical wall thicknesses is determined to some degree by manufacturing method. The film fabrication method is known to be useful for making honeycomb transparent insulations with very thin walls. Film-fabricated honeycombs are inherently flexible, and this flexibility increases as wall thickness decreases. For example, InsolCore, a film-fabricated transparent insulation made by Advanced Glazings Ltd. of Nova Scotia, Canada, has wall thickness on the order of 0.001". This flexibility can be used advantageously: such materials can be compressed to reduce volume while shipping and later re-expanded; and such materials can comply to the contours of underlying ceiling layers in ceiling-attic construction as described in our co-pending application no. CA 2,254,457.

However, flexibility becomes problematic when using honeycomb transparent insulation in applications such as daylighting, where the transparent insulation is mounted in a glazing unit between two sheets of rigid glazing material (typically glass, or plastic such as polycarbonate or acrylic). If a flexible honeycomb is simply sandwiched between glazings, as is done with rigid honeycomb transparent insulations, it is likely to sag under its own weight, drawing away from the frame at one or more edge of the glazing unit. This may be caused by gravity if the glazing unit is handled or mounted in a non-horizontal position, or it may simply happen as a result of dimensional changes caused by residual internal stresses in the honeycomb transparent insulation itself. One solution has been to attach the honeycomb to the edge (frame) of the glazing cavity, or to one or both of the rigid glazings that define the glazing unit itself. However, such a mounting procedure is labour-intensive and the use of adhesive to fasten a honeycomb to a glazing results is typically aesthetically displeasing.

It is well known that honeycomb transparent insulation scatters light and cannot transmit images at off-normal incidence. Therefore, glazing units filled with transparent insulation cannot be used in window applications where preservation of view is important. But the advantages of diffuse glazings for daylighting applications are well-known. Specifically, diffusely-transmitted light distributes throughout the interior of a building, reducing glare and shadowing relative to specularly-transmitted daylight. Filling the interior of a glazing unit with honeycomb transparent insulation contributes to the diffusing power of this glazing system. However, honeycombs are 'conical scatterers', that scatter incoming light over a range of azimuth angles, while preserving the original angle of inclination. This means that honeycomb transparent insulations have a limited ability to provide light diffusion at near-normal incidence angle. This also means that they transmit images at normal incidence, and thus a glazing unit made with specular (non-diffusing) glazings and honeycomb transparent insulation provides incomplete privacy. This is improved by the addition of one or more secondary diffusing layers, such as a loose-weave fibreglass cloth or veil, as is known in the state of the art.

The rigidity of a honeycomb material is greatly increased by bonding a sheet of material to one or both sides of the honeycomb. This principle is well-known in engineering and material science, and numerous light-weight composite honeycomb-core structural materials exist today. Examples are door panels made from wood veneer bonded to paper honeycombs, and high-tech plastic and metal honeycomb-core materials used in the aircraft industry. As well, honeycomb cores, adhesives, and skinning materials are readily available throughout the supply chain of the composites industry. The present invention takes advantage of the aforementioned principle in order to create a rigid sandwich from a flexible, thin-walled honeycomb transparent insulation core.

SUMMARY OF THE INVENTION

According to the present invention there is provided a composite light diffusing insulating glazing insert characterized in that it comprises a flexible thin-walled transparent honeycomb insulating core layer (10) defining a plurality of honeycomb cells, and a flexible skinning layer (18) bonded to each major surface of said core layer, each said flexible skinning layer having sufficient tensile and compressional stress to hold its own shape over dimensions in the order of the size of said cells whereby said composite glazing insert is substantially rigid.

The glazing insert may be in the form of honeycomb transparent insulation in glazing systems to create a light-diffusing, insulating insert that can be sandwiched between sheets of glass, plastic, or the like.

The skinning layer can be bonded to one or both sides of the insulation by means of an adhesive or by a heat-seal. The resulting covered honeycomb can be used as a diffusing, insulating glazing insert. The skinning layer may be a cloth, mesh, mat, veil, paper, or film, made from fiberglass, plastic, natural fiber, or other material.

This invention offers most of the benefits of transparent insulation itself, but also offers two additional advantages. First, the invention provides a practical way to utilize a thin-walled flexible honeycomb transparent insulation as an insulating and diffusing insert in glazing units. Second, it also provides a way to rigidize a thin-walled honeycomb transparent insulation material, so that it can hold its own dimensions prior to, and following, installation in a glazing unit. Such an insert can be used in the manufacture of diffuse insulating glazing units, in the same way as rigid transparent insulations, avoiding the problem of sag or dimensional changes inherent in the use of thin-walled flexible transparent insulations. It achieves this without the necessity of bonding the thin-walled flexible transparent insulation to the glazings or frame.

By use of this invention, the overall optical properties of the diffusing insulating glazing insert can be controlled through use of appropriate skinning layer(s). This can be used advantageously in several ways:

(a) Overall light transmittance of the insert can be reduced below that of the transparent insulation itself, as is often desirable to avoid excessive brightness in sunrooms or atriums. If a dense diffusing skinning layer is used, the insert will have lower overall light transmittance, than if a sparse high-transmittance skinning layer was used.

(b) The use of a diffuse skinning layer results in an insert with increased light diffusing power, relative to the transparent insulation itself.

(c) The use of a diffuse skinning layer results in an insert with enhanced privacy protection, relative to the honeycomb transparent insulation itself.

It is also possible to alter the thermal characteristics of the transparent insulation by using an appropriate skinning layer. In particular, the use of indium-tin-oxide coated fibreglass cloth diffusing layer or any similar cloth, film, or similar material that has low emissivity and high scattering or reflectivity in the thermal infrared, can enhance the insulation value of this invention.

The invention also provides a method of making a rigid light diffusing insulating glazing insert, characterized in that a flexible skinning layer is bonded to each major surface of a flexible thin-walled transparent honeycomb insulating core layer defining a plurality of honeycomb cells, each said flexible skinning layer having sufficient tensile and compressional stress to hold its own shape over dimensions in the order of the size of said cells so that said composite glazing insert becomes substantially rigid.

BRIEF DESCRIPTION OF DRAWINGS

FIG. 1 shows a honeycomb transparent insulation;

FIG. 2A shows a flexible thin-walled honeycomb transparent insulation with a diffusing layer one side, and FIG. 2B shows the diffusing layer bonded to both sides.

DETAILED DESCRIPTION AND PREFERRED EMBODIMENTS

Figure 3:
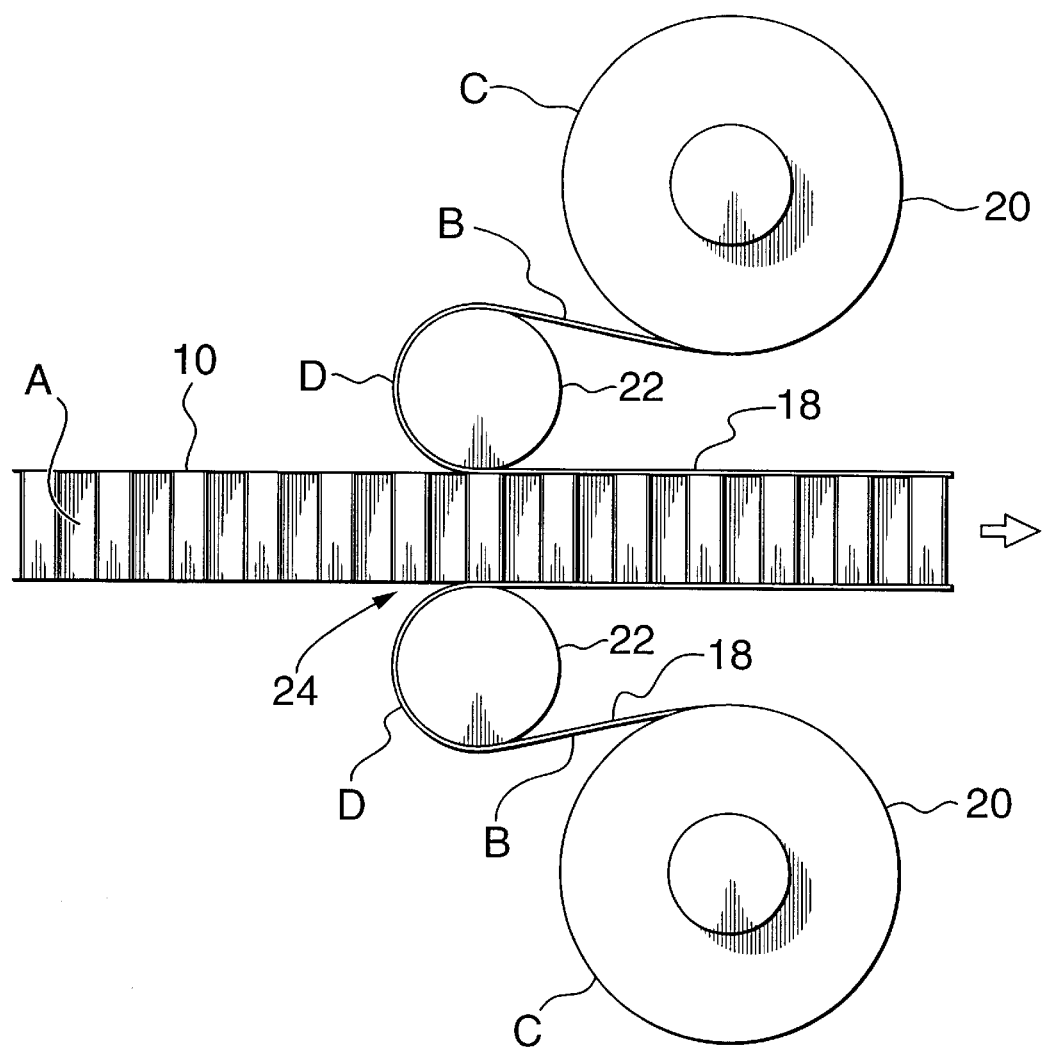
FIG. 3 illustrates an apparatus for continuously applying skin to thin-walled flexible honeycomb transparent insulation.

In FIG. 1, the honeycomb transparent insulation 10 lies in a plane 12. The axes 14 of the honeycomb cells 16 lie normal to this plane. As shown in FIGS. 2A and 2B, skinning layer 18 is bonded to one or both sides of the honeycomb insulation 10.

The core material 10 consists of a thin-walled flexible honeycomb transparent insulation. Honeycomb transparent insulation refers to honeycomb material with cells whose axes are parallel to the normal vector of the major plane of the honeycomb (i.e. the plane of the glazing). In order to transmit light the walls of the honeycomb must be non-absorbing to visible and or solar wavelengths. Typically, such non-absorbing walls are transparent; however, they may also be reflective. The walls may or may not scatter light to some degree, and if they do scatter light, the honeycomb may have a reduced light transmittance due to backscattering. This lower transmittance may or may not be an intentional feature of the honeycomb transparent insulation. However, any similar light-transmitting honeycomb material, that is partially flexible in nature, embodies the spirit of the invention.

The skinning layer or layers 18 may consist of any sheet material that transmits light to some degree, and preferably, but not necessarily, diffuses light. Examples are: fibreglass veil, mat, or cloth, paper, plastic film, natural fibre cloth, veil, or mat, and plastic cloth, veil or mat. The sheet may be white or coloured, in order to achieve desired aesthetics. In order to provide the necessary rigidity in final form, the skinning layer should have sufficient tensile and compressional strength to hold its own shape, over dimensions on the order of a cell size of a honeycomb (typically <0.4"). It is important to note that the skinning layer will be held in-plane by both the edges of the honeycomb cells to which it is bonded, and the sheet glazing which presses against the glazing insert in actual application. This helps prevent buckling under when a sheet is under compressional loading due to bending. In practice, this means that very thin sheet materials can add sufficient rigidity, including the thinnest fibreglass veil cloth.

Bonding can be by adhesive or heat-sealing techniques. Heat-sealing offers the advantage that no extra material is required, but it is more restrictive with respect to the materials that may be used.

Adhesive bonding technique requires that the adhesives can be applied either to the skinning layer, or alternatively, to the edges of the honeycomb. Following this technique, the honeycomb and skinning layer are pressed together and the glue is allowed to cure. Applying adhesive to the skinning layer requires much more adhesive, but guarantees a more uniform appearance. Applying adhesive to the edges of the honeycomb is very efficient with adhesive, because adhesive is applied only where needed. But the adhesive can leave visible marks the contact areas, and this has the potential to create aesthetically-displeasing appearance. Such marking can be avoided through appropriate choice of skinning material and adhesive.

A wide range of adhesives are suitable for this invention, including water-based polymer formulations, solvent-based polymer formulations, starch-based formulations, 2-part formulations such as epoxies, polyesters, polyurethanes, or UV-curing. A suitable adhesive should have sufficient strength, good UV resistance, resistance to colour change, and clarity. If adhesive is applied to the surface of the honeycomb, an appropriate gelling agent such as fumed silica should be added to the adhesive so that it can form a stable bead at the end of the cell wall, prior to application.

To bond by heat sealing, the skinning layer is heated above the melting temperature of the plastic honeycomb, and pressed onto the surface of the honeycomb layer. Heating and pressing may be done sequentially or at the same time. This can be accomplished in a batch process, by placing the skinning material on a heated surface, bringing the honeycomb in contact with the heated skinning material, and removing the honeycomb once the heat-bonding has taken place. It can also be done in a continuous process, as shown in FIG. 3, by bringing the skinning layer(s) and honeycomb in contact with each other, between two rolls, at least one of which is heated, and which are kept at a spacing that will create the necessary compression. The process can work equally well if heated rolls are replaced with non-rotating cylinders, plates, or similar, as long as other means are provided to pull the materials through the pinch point. In order to use the heat-sealing process, the skinning layer must be stable at temperatures above the melting point of the plastic honeycomb. Various fibreglass materials, including veil, mat, roving, etc. are highly compatible with this technique.

The skinning layer can be adhesive-bonded or heat-bonded.

One embodiment of an adhesive-bonded diffuse insulating glazing insert is made from a layer of InsolCore transparent insulation (Advanced Glazings Ltd., North Sydney, Nova Scotia). The top of this honeycomb is coated with a layer of water-based acrylic adhesive (Alpha 8010, Alpha Systems, Elkhart Indiana) to which 3% Cabosil M-5 fumed silica (Cabot Corp. Mass) has been added in order to 'gel' it. A layer of standard fibreglass veil mat, 0.010," thick (commonly available through any fiberglass products supplier) is pressed onto the honeycomb, and the adhesive is allowed to cure. The second side is covered similarly, and the result is a rigid, light weight, diffusing insulating glazing insert.

One embodiment of a heat-bonded diffuse insulating glazing insert is made from a layer of InsolCore transparent insulation (Advanced Glazings Ltd., North Sydney, Nova Scotia Canada). Standard fibreglass chopped-strand mat, ¾ oz per sq.ft., 0.020" thick (commonly available through any fiberglass products supplier) is bonded to both sides of the InsolCore. The bonding is accomplished by laying the fibreglass chopped-strand mat on an aluminum plate that is heated to approximately 500° F., and then pushing the honeycomb onto the heated fibreglass chopped-strand mat with light pressure just sufficient to achieve bonding, and then quickly removing the skinned honeycomb from the heated plate.

FIG. 3 illustrates a suitable manufacturing technique. Skinning layer 18 is removed from stock rolls 20, and heated as it wraps around heated drive rolls 22. Honeycomb transparent insulation is drawn through gap 24 between heated drive rolls 22. Bonding takes place at the pinch point.

In another preferred embodiment of the invention, a heat-bonded diffuse insulating glazing insert is made from a layer of lnsolCore(r) polypropylene transparent insulation (Advanced Glazings Ltd., North Sydney, NS Canada). In this embodiment a fiberglass chopped-strand 'surfacing veil' (Duraglass 8120, Johns Manville Corp., Toledo, Ohio) is bonded to both sides of the polypropylene layer. To bond the veil to the transparent insulation, the transparent insulation is first laid flat on a table, and the veil is laid on top of the transparent insulation. A heated roller, made from 3" diameter steel pipe covered in a standard Teflon™ non-stick coating with a radiative heating element running through the centre, is rolled over the top of the veil to heat-seal the veil to the surface of the transparent layer of the honeycomb material.

The transparent insulation is then flipped over, a veil laid on the opposite surface, and bonding is achieved in the same way. Good results were obtained with roller temperature of 450° F. (232° C.) and a rolling speed of 2 ft/minute (60 cms/min).

In order to control the thickness of the final product, a metal spacer was laid on the table, along either side of the honeycomb. The spacer height is slightly smaller than the height of the honeycomb (a spacer height of 2.480" (6.3 cms.) worked well with the 2.5" (6.35 cms.) thick honeycomb). This precisely limits the depth to which the roller compresses the honeycomb transparent insulation when it is softened by the heat of the roller.

The process can work equally well if the heated rolls are replaced with non-rotating cylinders, plates, or the like, as long as other means are provided to pull the materials through the pinch point.

What is claimed is:

1. A glazing system comprising a composite light diffusing insulating glazing insert sandwiched between two rigid transparent panes, said composite light diffusing glazing insert comprising a flexible transparent honeycomb insulating core layer defining a plurality of honeycomb cells, said honeycomb insulating core layer being sufficiently thin-walled that it sags under its own weight, and a flexible skinning layer bonded to each major surface of said core layer, each said flexible skinning layer having sufficient tensile and compressional stress to hold its own shape over said cells whereby said flexible skinning layers rigidize said honeycomb insulating core layer.

2. A glazing system as claimed in claim 1, wherein each said skinning layer is bonded to said core layer by adhesive or heat sealing.

3. A glazing system as claimed in claim 1, wherein each said skinning layer is selected from the group consisting of; veil, mat, roving, glass cloth, plastic cloth, natural fiber cloth, plastic film, and paper.

4. A glazing system as claimed in claim 1, wherein said transparent core layer also diffuses light.

5. A composite light diffusing insulating glazing insert comprising a flexible honeycomb insulating core layer defining a plurality of honeycomb cells, and a flexible skinning layer bonded to each major surface of said core layer, each said flexible skinning layer having sufficient tensile and compressional stress to hold its own shape over the dimensions of said cells whereby said composite glazing insert is substantially rigid, and wherein each said skinning layer is indium-tin-oxide coated fibreglass.

6. A rigid light-diffusing glazing system as claimed in claim 1, wherein said core layer is made of polypropylene.

7. A method of making a glazing system comprising:
   a) fabricating a composite rigid light diffusing insulating glazing insert by attaching a flexible skinning layer to each major surface of a flexible transparent honeycomb insulating core layer defining a plurality of honeycomb cells, said honeycomb insulating core layer being sufficiently thin-walled that it sags under its own weight, and each said flexible skinning layer having sufficient tensile and compressional stress to hold its own shape over the dimensions of said cells so that said flexible skinning layers rigidize said honeycomb insulating core layer, and
   b) sandwiching said composite rigid light diffusing insulating glazing insert between two transparent panes.

8. A method as claimed in cairn 7, wherein said skinning layer is sealed to said core layer by passing said core between rollers.

9. A method as claimed in claim 8, wherein said rollers are hot rollers and each said skinning layer is heat-sealed to said core layer.

10. A method as claimed in claim 9, wherein said skinning layer is bonded to the core layer with an adhesive.

11. A method as claimed in claim 7, wherein said core layer is first laid flat on a supporting surface, a first said skinning layer is applied to a first major surface of said core layer, a heated roller is applied to said first said skinning layer to bond said first said skinning layer to said first major surface, said core layer is flipped over, a second said skinning layer is applied to a second major surface of said core layer, and a heated roller is applied to said second skinning layer on said second major surface to bond said second skinning layer to said second major surface.

12. A method as claimed in claim 11, wherein a spacer is provided around said core layer to limit the compression of the core layer during application of said heated roller.

13. A method as claimed in claim 12, wherein said core layer is made of polypropylene.

* * * * *